United States Patent [19]

Planche et al.

[11] 4,286,217

[45] Aug. 25, 1981

[54] DEVICE FOR ELECTRODE-TYPE ELECTRICAL LOGGING TOOLS AND TOOL INCORPORATING SAID DEVICE

[75] Inventors: Jean Planche, Chevilly Larue; Jacques Tromelin, Longjumeau; Daniel Vannier, Versailles, all of France

[73] Assignee: Schlumberger Technology Corporation, Houston, Tex.

[21] Appl. No.: 8,302

[22] Filed: Feb. 1, 1979

[51] Int. Cl.³ .............................................. G01V 3/20
[52] U.S. Cl. ...................................... 324/347; 324/373
[58] Field of Search ............... 324/347, 366, 373, 355, 324/356, 369, 366

[56] References Cited

U.S. PATENT DOCUMENTS

| | | |
|---|---|---|
| 2,401,371 | 6/1946 | Pearson et al. |
| 2,779,915 | 1/1957 | Moon .................................. 324/347 |
| 2,871,444 | 1/1959 | Piety .............................. 324/366 X |
| 2,874,347 | 2/1959 | Southwick . |
| 2,917,704 | 12/1959 | Arps ............................... 324/356 X |
| 3,047,795 | 7/1962 | Pearson ............................... 324/347 |
| 3,065,404 | 11/1962 | Mayes et al. ......................... 324/366 |
| 3,072,843 | 1/1963 | Clements et al. ...................... 324/347 |
| 3,124,742 | 3/1964 | Schneider ............................. 324/373 |
| 3,268,801 | 8/1966 | Clements et al. ............... 324/347 X |
| 3,388,324 | 6/1968 | Birdwell et al. ...................... 324/373 |
| 3,488,574 | 1/1970 | Tanguy ................................. 324/373 |

FOREIGN PATENT DOCUMENTS 306437   6/1971   U.S.S.R. ................................. 324/347

*Primary Examiner*—Gerard R. Strecker

[57] ABSTRACT

A logging tool in accordance with the invention comprises a unitized electrode assembly adapted to be removably mounted on a central mandrel. The unitized electrode assembly comprises a metallic tube that is encased within an electrically-insulating sheath. An insulating sleeve surrounding the sheath carries various electrodes that are separated from each other by insulating spacers.

10 Claims, 3 Drawing Figures

DEVICE FOR ELECTRODE-TYPE ELECTRICAL LOGGING TOOLS AND TOOL INCORPORATING SAID DEVICE

BACKGROUND OF THE INVENTION

Various types of electrical measuring instruments are lowered into boreholes by an electric cable to investigate the subsurface earth formations penetrated by those boreholes. To carry out these measurements, these logging tools are equipped with varying numbers of electrodes depending on the type of measurements to be made. One typical logging tool includes a centrally-located electrode and several pairs of electrodes which are spatially disposed along the cylindrical tool body so as to be located symmetrically with respect to the central electrode. This type of logging tool is described, for example, in U.S. Pat. No. 3,772,589.

These logging tools generally include a central metal mandrel to give mechanical rigidity to the tool body. A sheath of electrically-insulating material encases the mandrel. Metal electrodes of hollow cylinders or annular bands having an inner diameter substantially equal to the outer diameter of the insulating sheath are mounted along the mandrel and separated from one another by insulated annular spacers having a thickness substantially equal to that of the electrodes. Longitudinal grooves on the interior surfaces of the electrodes and spacers define passages for receiving wires that are respectively connected to the electrodes and grouped together at one end of the tool for connection to a common plug.

Prior-art tools have sometimes been found to be unreliable due to the difficulty of maintaining adequate electrical insulation between the various components. Part of such problems come about since the insulating sheath on the tool mandrel must be relatively thin (about 1-mm) so as to not significantly increase the overall diameter of the tool body. It will be recognized, of course, that when the tool is disassembled for repair of some malfunction it is quite easy to damage this sheath. When the tool is disassembled, it is necessary to remove the spacers and sometimes even the electrodes. This disassembly is not always easy, however, since drilling mud has usually infiltrated into the tool body and has become caked. Moreover, certain parts may have become rusted and thereby further complicate the disassembly. In addition, when the insulating sheath itself has become defective, its replacement can be carried out only in a shop having suitable tools. It is also possible to create electrical insulation defects during the reassembly of the logging tool such as when the insulating spacers are being positioned. In fact, should a connection wire be poorly positioned in its groove, it can be pinched and damaged.

The repair of prior-art logging tools of this type is not very convenient; and, in most cases, such repairs usually cannot be performed directly on the drilling site. Usually the logging operation must be interrupted or postponed to bring the tool into a shop, thus involving a loss of time. Drilling downtime is costly and it will be appreciated that the possibility of having logging tools capable of being rapidly repaired on the drilling site clearly represents an unquestionable technical and economic advantage.

SUMMARY OF THE INVENTION

It is an object of the invention, therefore, to provide electrode-type electrical logging tools which are cooperatively arranged to provide reliable electrical insulation between the various components of the tool to improve the reliability of the tool while still facilitating its repair under field conditions.

This and other objects of the invention are accomplished by arranging an electrode-type electrical logging tool with a central mandrel and a unitized electrode assembly that is adapted to be removably mounted upon the central mandrel. This new and improved assembly includes an elongated support of an electrically-insulating material and having a longitudinal bore adapted to at least partially receive the mandrel. A plurality of electrodes are spatially mounted on the support and separated by a plurality of electrically-insulating spacers respectively maintaining the electrodes at selected intervals along the support. A plurality of connecting wires respectively connected to the electrodes are extended through conductor passages located between the support and the electrodes and spacers and positioned at a common end of the assembly.

BRIEF DESCRIPTION OF THE DRAWINGS

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

DESCRIPTION OF THE PREFERRED EMBODIMENT

Figure 1:
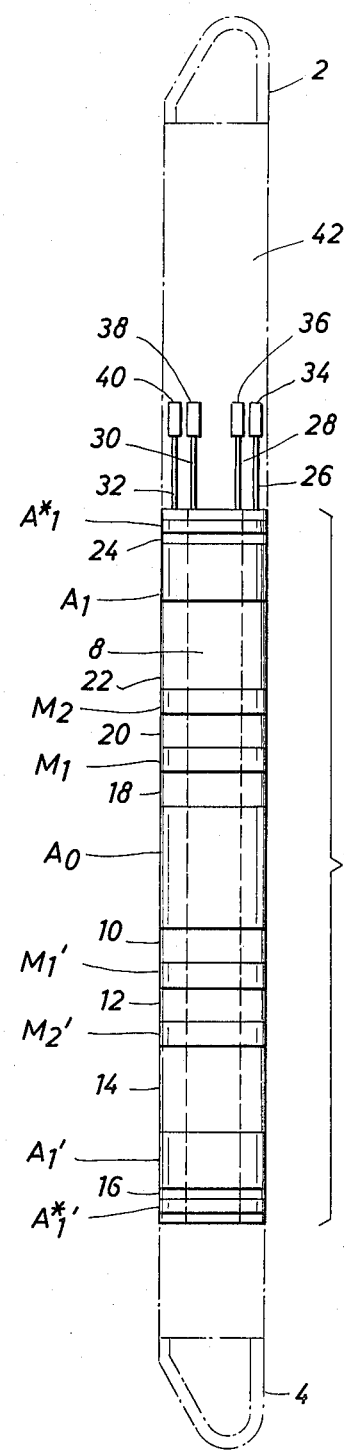
FIG. 1 is a schematic representation of a typical electrodetype logging tool.

Turning now to FIG. 1, an electrode-type electrical logging tool of typical design is illustrated as having a substantially-cylindrical form and is respectively terminated at its ends by removable carrying handles 2 and 4 that are used for handling and transporting the tool body. The tool itself includes a unique unitized electrode assembly 6 that is arranged in accordance with the principles of the present invention and removably mounted on a central mandrel 8. As is typical, the new and improved unitized assembly 6 includes a central electrode $A_o$ and several electrode pairs (as at $M_1 M_1'$, $M_2 M_2'$, $A_1 A_1'$ and $A^*_1 A^*_1'$) which respectively are coaxially aligned in relation to the mandrel 8 and symmetrically disposed along the mandrel with respect to the central electrode $A_o$. The electrodes are separated by insulating spacers 10 and 24 of a suitable electrical-insulating material. The electrode connection wires emerge from the unitized assembly 6 at 26, 28, 30 and 32 and are respectively connected to connection terminals, as at 34, 36, 38 and 40, in the compartment 42 of the tool. In addition to the connection terminals, this compartment includes electronic circuits such as amplifiers and the like.

Figure 2:
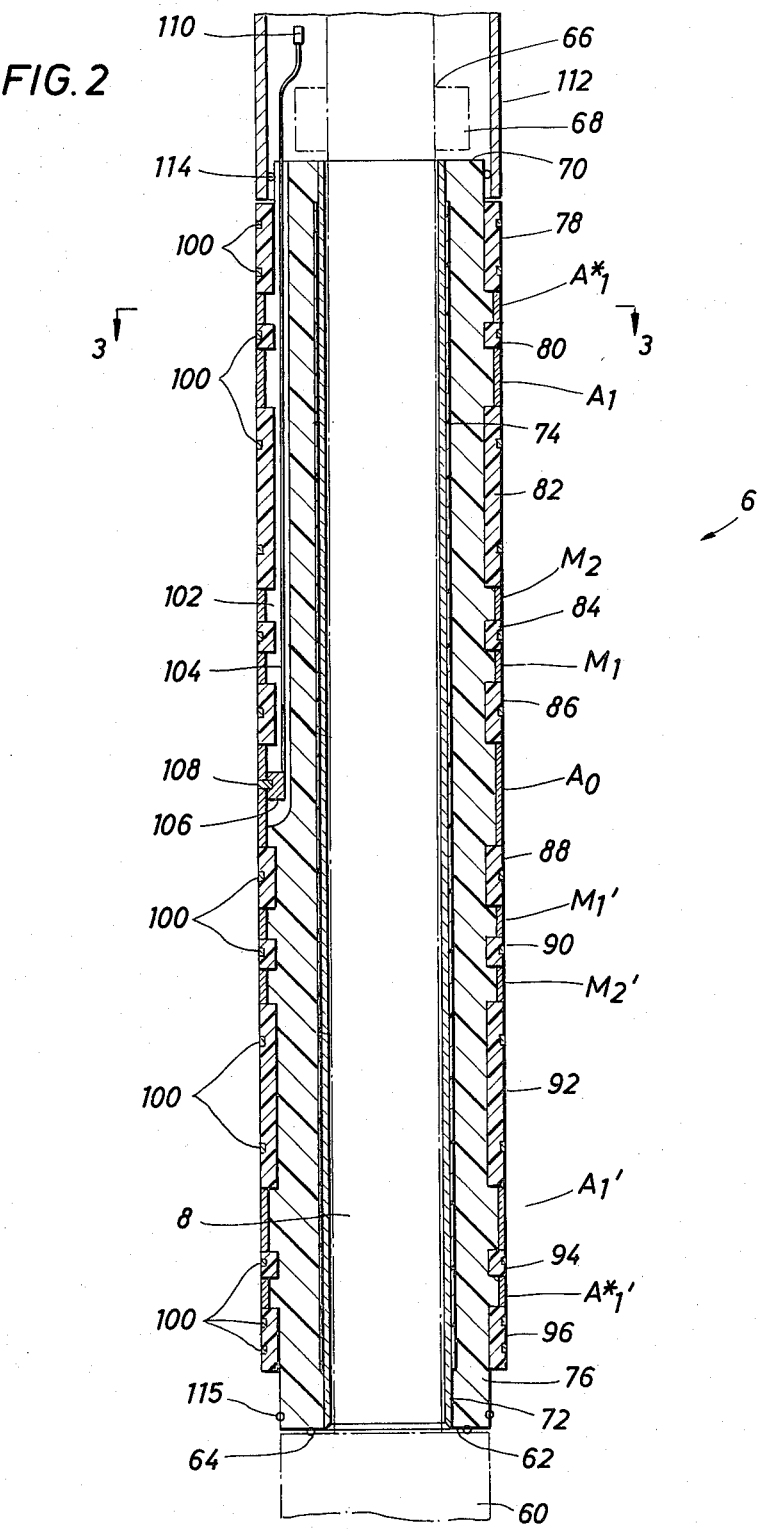
FIG. 2 is a longitudinal section of a preferred embodiment of the present invention.

A cross-sectional view of a preferred embodiment of the unitized assembly 6 is shown in FIG. 2, as it appears when mounted on the mandrel 8. The mandrel 8 is a metal tube of sufficient thickness to provide adequate mechanical rigidity. One end of the mandrel 8 is terminated by a shoulder 60 adapted for supporting the end 62 of the unitized assembly 6. Sealing between the opposed faces of the shoulder 60 and the assembly end 62 is provided by means such as an O-ring seal 64. The other end of the central mandrel 8 is threaded, as at 66, and carries a nut 68 which is tightened against the other end 70 of the unitized assembly 6 for mounting the assembly on the central mandrel so that the assembled tool body will be rigid. Sealing at this end can also be provided by an O-ring seal (not shown).

The unitized assembly 6 includes a tube 72 which is preferably made of stainless steel and having an internal diameter that is substantially greater than the external diameter of the central mandrel 8 of the tool. In this manner, the unitized assembly 6 can be easily disposed over the central mandrel 8. A sheath 74 of an electrical insulator such as Teflon ® and having a thickness of about 1-mm covers the tube 72. In the preferred manner of mounting the insulating sheath 74 on the tube 72, the sheath is diametrically expanded and, after it is positioned around the tube, the sheath is heated slightly to contract or shrink-fit it around the tube. An electrical insulating tube 76 preferably made of an epoxy fiberglass is disposed over the insulating sheath 74. In addition to protecting the sheath 74 from damage, the exterior tube 76 also serves to make the unitized assembly 6 more rigid. The tube 76 also acts as a second electrical insulator between the electrodes and the central mandrel 8 of the tool. The electrode $A_o$ is placed around the mid-portion of the insulating sleeve 76.

The measuring electrodes $M_1 M_1'$, $M_2 M_2'$, $A_1 A_1'$ and $A^*_1 A^*_1'$ are mounted around the insulating sleeve 76 so that each is symmetrically positioned with respect to the central electrode and coaxially aligned with the longitudinal axis of the unitized assembly 6. In the preferred embodiment of the assembly 6, the electrodes are composed of thin metallic cylinders or annular bands about 2-mm thick sized to fit on the electrically-insulating support 76.

The electrodes are separated from each other and maintained in coaxial alignment with the longitudinal axis of the unitized assembly 6 by spacers 78 through 96 which surround the insulating sleeve 76. Each spacer is placed inside a recess on the outer surface of the insulating sleeve 76. Consequently, the spacers as well as the electrodes are kept in a fixed position along the length of the unitized assembly 6 and cannot move. In the preferred embodiment of the assembly 6, each spacer is made up of two identical half-cylinders consisting of an electrically-insulating material such as an epoxy fiberglass. The two half-cylinders of each spacer 78 through 96 are brought together and secured as by a tie 100 placed in a groove on the outer surface of the spacers to form a complete cylinder.

Longitudinal grooves 102 parallel to the longitudinal axis of the unitized assembly 6 are arranged in the support 76 to provide conductor passages for the several insulated electrodeconnection wires as at 104. A stud, as at 106, is arranged on the end of each connection wire for connection to the electrodes. For this purpose, each electrode has a hole 108 (shown only for the electrode $A_0$ in FIG. 2), the stud 106 being opposite the hole 108. The electrical connection between the electric wire 104 and the electrode is achieved by securing (e.g., welding) the stud 106 to the electrode through the hole 108 and then completely filling that hole with a hardenable insulating material. The other end of the wires 104 have connection terminals 110 that facilitate connection of the electrode leads to the electronic circuits of the logging tool. Once the wires 104 are positioned, the longitudinal grooves 102 in the insulating sleeve 76 are preferably filled and also covered by an electrically-insulating hardenable material.

A sleeve 112 of the logging tool fits around the end 70 of the unitized assembly 6. If desired, sealing can be provided by an O-ring seal 114. Accordingly, the drilling mud cannot penetrate into the tool at this point. Any leakage current paths which may occur between an electrode and the central sleeve of the tool is thus lengthened. Similarly, when another tool is used with the described tool, an O-ring seal 115 located on the outer surface of the insulating sleeve 76, at the end 62, provides sealing with a cylindrical connecting piece (not shown) fitting around the sleeve 76 at the end 62.

Figure 3:
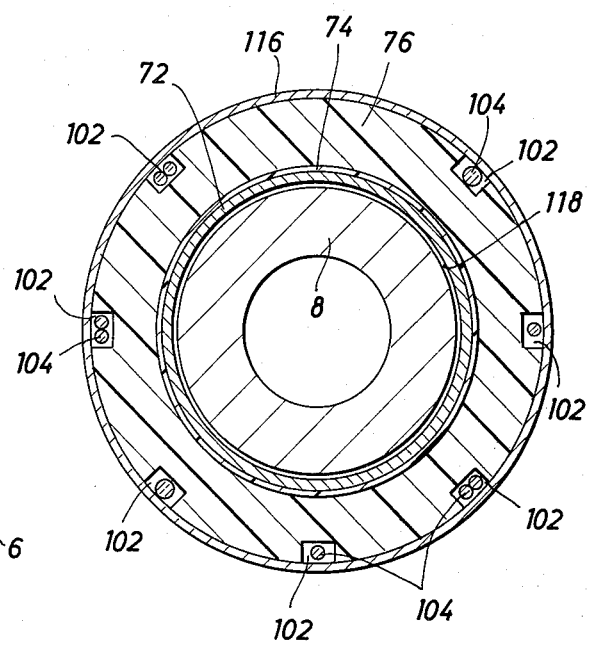
FIG. 3 is a cross-sectional view taken along the lines "3—3" in FIG. 2.

FIG. 3 shows a cross-sectional view through electrode $A^*_1$ along the lines "3—3" of FIG. 2. The central mandrel 8 of the tool is surrounded by the unitized assembly comprising the metallic cylinder 72, the insulated sheath 74, which is surrounded by insulating sleeve 76, about which there is placed electrode 116. The longitudinal grooves 102 are disposed on the outer surface of insulating sleeve 76. Wires 104 running longitudinally through the tool are placed in grooves 102 which are preferably filled with an electrically insulating hardenable material. The annulus 118 between the central mandrel 8 of the tool and the inner metallic cylinder 72 of the unitized assembly is preferably filled with grease in order to avoid infiltration of drilling mud, thus preventing the occurrence of rusting during and after the tool is used in an oil and gas well. The mounting and removal of the unitized assembly 6 from central mandrel 8 are thus facilitated.

The advantages of a logging tool equipped with the unitized assembly 6 as described above are numerous. In fact, the electrical insulation between the central mandrel 8 of the tool and the several electrodes is excellent since the sheath 74 and the sleeve 76 define two electrical-insulation layers. Furthermore, it should be noted that the metallic cylinder 72 and the insulating sleeve 76 effectively protect the electrically-insulating sheath 74 against shocks and corrosion.

It is also of particular note that the unitized assembly 6 is compact and sturdy. Owing to the ease by which it can be removed and replaced on the central mandrel 8 of the logging tool, the unitized assembly 6 can be very easily repaired because, in the event of failure of the tool, it is necessary only to replace the unitized assembly. Furthermore, ready access to the wiring of the electrodes is provided without any danger of damaging the electrically-insulating sheath 74. Likewise, there is no risk of damaging the insulation of the wiring as 104 during the reassembly of the electrodes and the spacers. The unitized assembly 6 can be manufactured, tested, and maintained independently of the rest of the logging tool, thereby representing an advantage with respect to handling and base requirements since these tools are heavy and long. It is, of course, readily apparent that other configurations of electrodes can be employed and that the invention is equally applicable to all electrical logging tools irrespective of the electrode or coil arrangement being used.

While only a particular embodiment of the present invention has been show and described, it is apparent that changes and modifications may be made without departing from this invention in its broader aspects; and, therefore, the aim in the appended claims is to cover all such changes and modifications as fall within the true spirit and scope of this invention.

What is claimed is:

1. A unitized electrode assembly adapted for removable mounting, as a unit, on electrode-type electrical logging tools having a central mandrel and comprising:
   a metal tube having an internal diameter substantially greater than the external diameter of the central mandrel of the tool for which it is adapted, for freely and at least partially and removably receiving therein the central mandrel of such an electrode-type logging tool;
   first electrically-insulating means coaxially arranged on said metal tube;
   second electrode-supporting electrically-insulating means coaxially arranged on said first means;
   a plurality of longitudinally-spaced electrodes spatially arranged at spaced intervals along and supported upon said second means;
   a plurality of electrically-insulating spacers respectively arranged on said second means between said electrodes and adapted for maintaining said electrodes at selected positions thereon;
   means for securing said spacers on said second means;
   means defining conductor passages extending between said second means and said electrodes and spacers; and
   conductor means in said conductor passages respectively connected to said electrodes for electrically connecting said electrodes to such a logging tool.

2. The electrode assembly of claim 1 wherein said electrodes are hollow metallic cylinders cooperatively fitted on said second means.

3. The electrode assembly of claim 2 wherein said insulating spacers are annular and said second means has recesses formed therein for receiving each of said insulating spacers.

4. The electrode assembly of claim 3 wherein each of said insulating spacers is comprised of at least two arcuate sectors and said sectors are secured in position around said second means so as to form a complete cylinder.

5. The electrode assembly of claims 1, 2, 3 or 4 wherein said first electrically-insulating means includes a polymerized synthetic resin sleeve and said second electrically-insulating means includes an epoxy fiberglass sleeve.

6. An electrical logging tool having a removably mounted unitized electrode assembly, comprising:
   a central mandrel;
   a metal tube having an internal diameter substantially greater than the external diameter of said central mandrel for freely and at least partially and removably receiving therein said central mandrel;
   first electrically-insulating means coaxially arranged on said metal tube;
   second electrode-supporting electrically-insulating means coaxially arranged on said first means;
   a plurality of longitudinally-spaced electrodes spatially arranged at spaced intervals along and supported upon said second means;
   a plurality of electrically-insulating spacers respectively arranged on said second means between said electrodes and adapted for maintaining said electrodes at selected positions thereon;
   means for securing said spacers on said second means;
   means defining conductor passages extending between said second means and said electrodes and spacers;
   conductor means in said conductor passages respectively connected to said electrodes for electrically connecting said electrodes to the remainder of said tool; and
   sealing means cooperatively arranged for preventing the entrance of well bore fluids between said central mandrel and said metal tube.

7. The logging tool of claim 6 wherein said electrodes are hollow metallic cylinders cooperatively fitted on said second means.

8. The logging tool of claim 7 wherein said insulating spacers are annular and said second means has recesses formed therein for receiving each of said insulating spacers.

9. The logging tool of claim 8 wherein each of said insulating spacers is comprised of at least two arcuate sectors and said sectors are secured in position around said second means so as to form a complete cylinder.

10. The logging tool of claims 6, 7, 8 or 9 wherein said first electrically-insulating means includes a polymerized synthetic resin sleeve and said second electrically-insulating means includes an epoxy fiberglass sleeve.

* * * * *